US012361830B2

(12) United States Patent
Chamberlin et al.

(10) Patent No.: US 12,361,830 B2
(45) Date of Patent: Jul. 15, 2025

(54) PEDESTRIAN DENSITY AND PROXIMITY RECOGNITION WITH VEHICLE AND MOBILE DEVICE COUNTERMEASURES

(71) Applicant: GM GLOBAL TECHNOLOGY OPERATIONS LLC, Detroit, MI (US)

(72) Inventors: Kurt Chamberlin, Bristol, RI (US); Russell A. Patenaude, Macomb Township, MI (US); Matthew E. Gilbert-Eyres, Rochester Hills, MI (US); Eric T. Hosey, Royal Oak, MI (US); Noah Stone, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 245 days.

(21) Appl. No.: 18/296,643

(22) Filed: Apr. 6, 2023

(65) Prior Publication Data

US 2024/0339033 A1    Oct. 10, 2024

(51) Int. Cl.
  *G08G 1/16*    (2006.01)
  *B60K 31/00*    (2006.01)
  (Continued)

(52) U.S. Cl.
  CPC ......... *G08G 1/166* (2013.01); *B60K 31/0008* (2013.01); *B60Q 5/006* (2013.01);
  (Continued)

(58) Field of Classification Search
  CPC .... G08G 1/096725; G08G 1/16; G08G 1/166; B60K 31/0008; B60K 2031/0091;
  (Continued)

(56) References Cited

U.S. PATENT DOCUMENTS 11,926,259 B1 *  3/2024  Joo ..................... B60Q 9/00
12,272,138 B1 *  4/2025  Annigeri ............. G06V 10/764
(Continued)

FOREIGN PATENT DOCUMENTS

CA    3111387 A1 *  9/2021  ............. B60Q 1/525
CN  108263324 B  *  8/2022  ............... B60Q 1/44
(Continued)

OTHER PUBLICATIONS

Srinivasan, et al., "Smart Crosswalk Management with Vehicle-to-Pedestrian Communication," 2023 Intl Conference on Sustainable Communication Networks and Application (ICSCNA), Theni, India, 2023, pp. 992-997, doi: 10.1109/ICSCNA58489.2023.10370389. (https://ieeexplore.ieee.org/document/10370389) (Year: 2023).*

(Continued)

*Primary Examiner* — Atul Trivedi
(74) *Attorney, Agent, or Firm* — Quinn IP Law

(57) ABSTRACT

A vehicle has been proposed that is equipped with a processing system coupled to different sensors that may anticipate and mitigate risks leading to vehicle-pedestrian incidents. In some aspects, the processing system identifies, using a plurality of sensors and external vehicle sources over a wireless network, data elements indicating that the vehicle is a potential hazard to a pedestrian. Using the elements, the processing system may determine values of a pedestrian hazard level (PHL) that correspond to successively increasing risks. Where the PHL meets a threshold, the system may employ countermeasures to proactively mitigate the risks of pedestrian incidents.

20 Claims, 6 Drawing Sheets

(51) Int. Cl.
*B60Q 5/00* (2006.01)
*B60Q 9/00* (2006.01)
*B60T 7/22* (2006.01)
*G06N 5/022* (2023.01)

(52) U.S. Cl.
CPC ............... *B60Q 9/008* (2013.01); *B60T 7/22* (2013.01); *G06N 5/022* (2013.01); *B60K 2031/0091* (2013.01); *B60T 2201/022* (2013.01)

(58) Field of Classification Search
CPC .......... G60Q 5/006; B60Q 9/008; B60T 7/22; B60T 2201/022; G06N 5/022; B60W 30/09; B60W 30/095; B60W 30/146; B60W 50/14; B60W 50/16; B60W 2050/143; B60W 2540/229; B60W 2552/45; B60W 2552/53; B60W 2554/4029; B60W 2554/406; B60W 2555/20; B60W 2556/65; B60W 2720/10; B60W 2756/10
USPC ........................................................ 701/26
See application file for complete search history.

(56) References Cited

U.S. PATENT DOCUMENTS

| | | | | |
|---|---|---|---|---|
| 2005/0278088 | A1* | 12/2005 | Thorner | B60Q 9/005 |
| | | | | 701/28 |
| 2013/0187792 | A1* | 7/2013 | Egly | G08G 1/162 |
| | | | | 340/901 |
| 2021/0270620 | A1* | 9/2021 | Nepomuceno | G01C 21/3626 |
| 2021/0300306 | A1* | 9/2021 | Costin | B60T 7/22 |
| 2021/0312811 | A1* | 10/2021 | Ohlarik | G08G 1/20 |
| 2021/0323549 | A1* | 10/2021 | Beauchamp | G08G 1/161 |
| 2022/0012988 | A1* | 1/2022 | Avadhanam | G08G 1/166 |
| 2022/0032906 | A1* | 2/2022 | You | B60W 30/0956 |
| 2022/0227360 | A1* | 7/2022 | Delhaye | H04W 4/44 |
| 2022/0355802 | A1* | 11/2022 | Chaves | B60W 40/09 |
| 2023/0192078 | A1* | 6/2023 | Nie | B60W 60/00274 |
| | | | | 701/301 |
| 2023/0204378 | A1* | 6/2023 | Fowe | G08G 1/0129 |
| | | | | 701/450 |
| 2023/0316921 | A1* | 10/2023 | Ramamurthy | G08G 1/0116 |
| | | | | 701/117 |
| 2024/0062656 | A1* | 2/2024 | Forscher | G08G 1/163 |
| 2024/0339033 | A1* | 10/2024 | Chamberlin | B60K 31/0008 |
| 2025/0026356 | A1* | 1/2025 | Cope | H04W 4/46 |
| 2025/0074468 | A1* | 3/2025 | Park | B60W 60/0011 |
| 2025/0087091 | A1* | 3/2025 | Hucek | G08G 1/096775 |
| 2025/0100572 | A1* | 3/2025 | Murthy | B60W 50/14 |

FOREIGN PATENT DOCUMENTS

| | | | | | |
|---|---|---|---|---|---|
| CN | 114852068 | A | * | 8/2022 | ............ B60W 30/09 |
| CN | 108263379 | B | * | 1/2023 | ............... B60Q 1/44 |
| CN | 119261882 | A | * | 1/2025 | |
| DE | 102021125956 | A1 | * | 4/2022 | ............. B60Q 1/326 |
| DE | 102023207668 | A1 | * | 2/2025 | |
| EP | 4307273 | A1 | * | 1/2024 | ........... B60W 40/09 |
| KR | 102622937 | B1 | * | 1/2024 | |
| WO | WO-2022039633 | A1 | * | 2/2022 | ............. E01F 9/615 |
| WO | WO-2023042371 | A1 | * | 3/2023 | ............ G06V 20/52 |
| WO | WO-2024171146 | A1 | * | 8/2024 | |
| WO | WO-2024243765 | A1 | * | 12/2024 | |

OTHER PUBLICATIONS

Srinivasan, et al., "Smart Crosswalk Management with Vehicle-to-Pedestrian Communication," 2023 International Conference on Sustainable Communication Networks and Application (ICSCNA), Theni, India, 2023, pp. 992-997 (https://ieeexplore.ieee.org/document/1037038 (Year: 2023).*

Petit, et al., "Risk Assessment by a Passenger of an Autonomous Vehicle Among Pedestrians: Relationship Between Subjective and Physiological Measures," Nov. 22, 2021;2:682119. doi: 10.3389/fnrgo.2021.682119 (https://pmc.ncbi.nlm.nih.gov/articles/PMC10790836/) (Year: 2021).*

* cited by examiner

PEDESTRIAN DENSITY AND PROXIMITY RECOGNITION WITH VEHICLE AND MOBILE DEVICE COUNTERMEASURES

INTRODUCTION

Since 2009, annual pedestrian casualties in the United States have increased, despite that the combined number of pedestrian-related collisions have remarkably decreased in the same time span. The increased number of roadways shared by motorcycles, motor vehicles and pedestrians is one of several factors contributing to the problem. Shared roadways create inherent risks for pedestrians and drivers alike, often leading to such collisions across the gamut of automobile manufacturers.

SUMMARY

To overcome these deficiencies in the art, a pedestrian density and proximity recognition (PDPR) system is disclosed. The PDPR system may initiate a variety of countermeasures, including alerting the driver of the potential hazard and suggesting mitigating tactics, among other possibilities. In cases of an imminent pedestrian strike, the countermeasures may include the PDPR system itself initiating an automated braking or other maneuvering in real time to avoid a potentially tragic result. Other embodiments allow sharing of information between vehicles to mitigate the overall risk, and even sharing of information with pedestrians, e.g., via a mobile device, to provide advance warning to the pedestrian or to another driver.

In an aspect of the present disclosure, a vehicle includes a vehicle body, a plurality of sensors coupled with the vehicle body, and a processing system. The processing system is arranged in the vehicle body and is configured to identify, using a plurality of sensors, one or more data elements indicating that the vehicle is a potential hazard to a pedestrian. The processing system is configured to determine a pedestrian hazard level (PHL) based on the identified one or more data elements. The PHL determination is based at least in part on adding together weighted numerical values ascribed to different ones of the one or more data elements. The processing system is configured to employ one or more countermeasures when the PHL meets a threshold.

In various embodiments, the processing system is further configured to identify the one or more data elements using third party data from external vehicle sources or from other vehicles via a wireless network connection. The processing system may be further configured to use the plurality of sensors and the external vehicle sources to identify (1) information related to pedestrian populations in regions within a specified range of the vehicle, and (2) conditions of the regions including weather and pedestrian activity.

In various embodiments, upon determining that the PHL meets a threshold, the processing system is configured to identify when the vehicle is entering a region, or is within a region, which poses an increased risk of a pedestrian-related incident. In such a case, the processing system may be configured to proactively alert a driver of the vehicle to the increased risk or proactively initiate automated action to prevent occurrence of the pedestrian-related incident. The one or more countermeasures may include without limitation the proactive alert conveyed to the driver via the vehicle display, the initiated action, and at least one suggested alternate route calculated by the processing system and displayed on the vehicle display for rerouting the driver away from the region. In some embodiments, when the PHL meets the threshold, the processing system is further configured to automatedly increase a sensitivity of one or more forward collision sensors of the vehicle, and to do so in or near real time.

In various embodiments, in determining the PHL, the processing system may be configured to invoke a predictive model that evaluates relative risk factors relevant to vehicle maneuvers tending to cause or avoid a potential pedestrian strike. The processing system may, for example, be configured to evaluate risk factors in the predictive model using the one or more data elements from the plurality of sensors and other data received over a wireless network from another vehicle or source. In some cases, the risk factors include an estimated density of pedestrians in a region, one or more pedestrians detected in an immediate vicinity of the vehicle by one or more of the plurality of sensors, a relative likelihood of pedestrian activity nearby a certain zone during a specific time, inclement weather, or driving behaviors that adversely affect vehicle handling. These and other factors may be used by the processing system in evaluating a PHL value corresponding to the applicable risk.

Different numbers of risk levels may be selected, depending on the availability of data, the overall sophistication of the system, and other factors. In one exemplary embodiment, the processing system may be configured to aggregate and tabulate each of the one or more data elements, using the predictive model, to determine a first PHL that extends from minimal to no pedestrian risk, to one or more ascending PHLs relevant to a progressively increasing pedestrian risk, to an upper PHL corresponding to an imminent pedestrian strike. The processing system may employ at least one countermeasure, or many countermeasures, for the determined PHL except in the case for the first PHL corresponding to minimal or no pedestrian risk.

In various embodiments, when the determined PHL based on the predictive model designates a region of increased pedestrian density but without imminent risk of a strike, the corresponding one or more countermeasures include alerting the driver using visual cues via the vehicle display or using audio cues via one or more speakers and increasing the sensitivity of one or more of the plurality of sensors. The processing system may further be configured to use the predictive model to detect a PHL corresponding to at least a moderate risk of a subsequent pedestrian strike, including a dense pedestrian population in relative proximity to the vehicle. In such event, the processing system may be configured to issue one or more countermeasures including automatedly limiting vehicle speed in or near-real time at a rate and magnitude proportionate with the relative proximity of the pedestrian population to the vehicle, and to alert the driver via audio or haptic feedback. In addition, the one or more countermeasures may include adjusting lighting where needed to provide clarity for one or both of the driver and the dense pedestrian population or further heightening of the sensitivity of one or more of the sensors.

In some embodiments, the processing system may be configured to determine, using the predictive model, a PHL within the possible range of PHLs corresponding to a potentially imminent collision with a high degree of confidence. The processing system may employ countermeasures including automatic braking and engaging a horn on the vehicle to alert pedestrians. The processing system may also employ, when the predictive model deems appropriate, a plurality of different ones of the countermeasures concurrently. In other examples, the processing system is further configured to offboard risk data identified by the predictive model to other vehicles and pedestrians via mobile devices and one or more networks, respectively, to generate a shared awareness of pedestrian-related risks in the area.

In another aspect of the disclosure, a mechanical transport structure includes a body, a dashboard arranged within the body, a display on the dashboard, and a processing system in the body. A wireless transceiver is coupled to the processing system and is configured to receive data from an external source for forwarding to the processing system. The transport structure further includes a plurality of vehicle sensors arranged on the body. The processing system is electrically connected to the sensors and configured to receive data indicative of sensor type. The processing system is configured to invoke a predictive model for estimating a pedestrian hazard level (PHL). The PHL has a plurality of values commensurate with successive levels of increasing risk in different situations of a pedestrian incident. Each of the plurality of values determined by the processing system is based at least in part on the received data from at least one of the vehicle sensors or from the external source. The received data is used by the processing system when needed to recommend action to the driver or to automatedly initiate proactive vehicular action to mitigate the risk of the pedestrian incident.

In various embodiments, the external source includes another vehicle, and the data is precautionary data. For at least one of the values of the PHL, the processing system may be configured to recommend adjusting the behavior of the driver to mitigate the risk of the pedestrian incident. Also, in some embodiments, at least one of the vehicle sensors and the external source are configured to convey to the processing system an estimated pedestrian density in an identified region. In evaluating a PHL value, the processing system may be further configured to determine an increased likelihood of pedestrian activity near a specified time or geographical zone, and to communicate the information to the driver of the vehicle via the display.

In yet another aspect of the disclosure, a vehicle includes a body, a processing system arranged in the body, and a transceiver configured to exchange data between the processing system and an external source over a wireless transmission. A plurality of vehicle sensors may be arranged on the body. The processing system may be electrically connected to the sensors and configured to receive data indicative of sensor type. The processing system may be configured to invoke a predictive model for estimating a pedestrian hazard level (PHL). The PHL corresponds with a plurality of values commensurate with successive levels of risk of a pedestrian strike. Each such value is associated with a set of actions for mitigating the risk. The processing system is further configured, based at least in part on the data received from one or more of the plurality of sensors or the external source, to identify a value corresponding to a possible pedestrian strike. Per the identified value, the processing system is configured to make specified driver recommendations or take proactive vehicular action to attempt to avoid the pedestrian strike.

In still another aspect of the disclosure, a method for use aboard a vehicle includes identifying, using a plurality of sensors of the vehicle, one or more data elements indicating that the vehicle is a potential hazard to a pedestrian. The method further includes determining, via a processing system of the vehicle, a pedestrian hazard level (PHL) based on the identified one or more data elements, the PHL determination being based at least in part on adding together weighted numerical values ascribed to different ones of the one or more data elements. The method also includes employing one or more countermeasures via the processing system when the PHL meets a threshold.

The above summary is not intended to represent every embodiment or every aspect of the present disclosure. Rather, the foregoing summary merely provides examples of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes the various combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, explain the principles of the disclosure.

Figure 1:
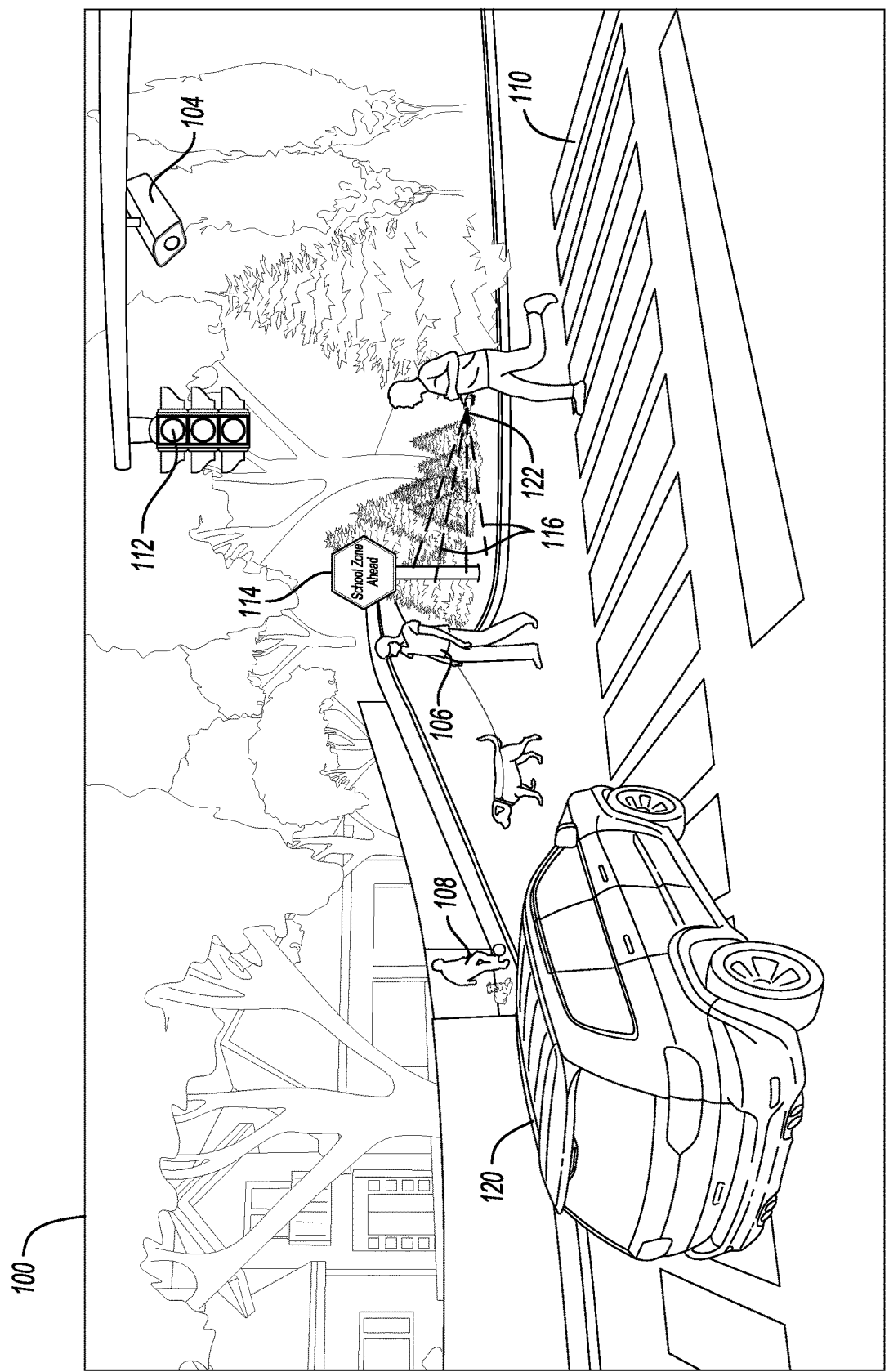
FIG. 1 is a conceptual diagram of an example environment involving the use of roadways by pedestrians and vehicles.

The appended drawings are not necessarily drawn to scale and may present a simplified representation of various features of the present disclosure, including, for example, specific dimensions, orientations, locations, and shapes. In some cases, well-recognized features in certain drawings may be omitted to avoid unduly obscuring the concepts of the disclosure. Details associated with such features will be determined in part by the particular intended application and use case environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." For example, "optimal vehicle routes" may include one or more optimal vehicle routes. Moreover, words of approximation such as "about," "almost," "substantially," "generally," "approximately," etc., may be used herein in the sense of "at, near, or nearly at," or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

The principles of the present disclosure are generally directed to a system for use in a vehicle or other mechanical transport structure (e.g., bus, train, truck, go-cart, and the like) for mitigating the potential occurrences of pedestrian incidents or pedestrian strikes. For purposes of this disclosure, a "pedestrian strike" is an incident in which a vehicle or portion thereof collides with a pedestrian, whether or not resulting in harm to the pedestrian. A pedestrian incident is similarly intended to encompass a situation involving a collision or contact between one or more vehicles and one or more pedestrians. Pedestrians should be construed broadly for purposes of this disclosure and includes an individual that is sufficiently close to a vehicle to create a risk of a strike or otherwise risk of harm. As an example, an infant in a stroller qualifies as a pedestrian, as does the individual in control of the stroller. The pedestrian may, but need not, be on the roadway. The pedestrian may be in a crosswalk or on grass, for example, in the event of a park that is adjacent an active roadway. Thus, the risk of a pedestrian incident (which includes a pedestrian strike) itself is at issue rather than the specific location of the pedestrian.

In various aspects herein, the vehicle includes a body, which may be considered an enclosure within the vehicle frame. The vehicle described herein includes a processing system, described in greater detail below. The processing system may be located in an electronic control unit (ECU) of a vehicle. In other cases, the processing system may be distributed across a plurality of processing components at different locations in the vehicle body. The processing system according to various embodiments includes a memory storing a predictive algorithm, or a suite of algorithms including one or more predictive algorithms, that are germane to performing certain tasks enumerated herein. The vehicle or transport structure also may include a plurality of sensors. These sensors may include, for example and without limitation, cameras, motion detectors, collision alert sensors, proximity sensors (including with respect to objects other than the vehicle), air flow sensors, engine speed sensors, throttle position sensors, and many other types. In addition to the various sensors located on the vehicle, the vehicle may communicate with other vehicles using one or more wireless networks, such as in a vehicle-to-vehicle (V2V) or a vehicle-to-everything (V2X) configuration. The vehicle may also obtain information from remote sources over a wireless network, such as a proprietary network used by a particular manufacturer, or another wireless network to obtain information about location, weather, public alerts, and information about gatherings, protests and the like.

The processing system may collect and analyze information from the one or more sensors together with telematics information from other vehicles or remote sources. Using this data, the processing system may execute a suite of algorithms that use the sensors, existing connections, and vehicle predictions to identify additional relevant data, such as assessing nearby populations, weather, and behavior of the driver of the vehicle, among other possible resources. With this data, the predictive algorithm may have the requisite knowledge to identify when the subject vehicle may be entering an area (or may already be within the area) that poses an increased risk of a pedestrian-related incident. The processing system may use a pedestrian hazard level (PHL), as described below, to ensure that the risk of a pedestrian-related incident is mitigated, if not altogether removed.

In various embodiments, the processing system may also offboard this information to other vehicles in the vicinity. In so doing, the processing system may proactively alert other drivers to the same types of risks encountered by the vehicle. Drivers of the initial vehicle, and these other vehicles receiving the risk determinations from the initial vehicle, may be given alternative routes to leave the area and avoid pedestrian encounters. Meanwhile, the processing system may automatedly, in or near real time, make appropriate adjustments to avoid the pedestrian risks. For example, the processing system may automatically increase the sensitivity of the forward collision sensors to limit the risk and severity of an incident.

Thus, by combining in-vehicle hardware (e.g., sensors such as collision detectors, cameras, etc.) with the algorithmic suite and external data sources, the vehicle may invoke a predictive model to determine, and ultimately overcome, the overall risk of a catastrophic pedestrian strike.

FIG. 1 is a conceptual diagram of an example environment 100 involving the use of roadways by pedestrians and vehicles. The vehicle 120 is cruising through a neighborhood including one or more houses and trees. The vehicle 120 in this example need not just include an automobile; rather the vehicle 120 may include different types of motor vehicles such as a bus, truck, van, or other transport structure 120. Vehicle/transport structure 120 is assumed to include a variety of sensors used in connection with the processing system as discussed herein. These sensors may include cameras, proximity sensors, vibration sensors, acoustic sensors, and the like. The region includes a stoplight 112 as well as a camera 104. The region may further include signs, such as the "school zone ahead" sign 114. In some embodiments, the vehicle may include a forward-looking camera for imaging sign 114. The processing system may use optical character recognition techniques to identify the sign as indicating that a pedestrian hazard may be on the road to the left. The manner in which these risks are interpreted is discussed in greater detail below.

Figure 3:
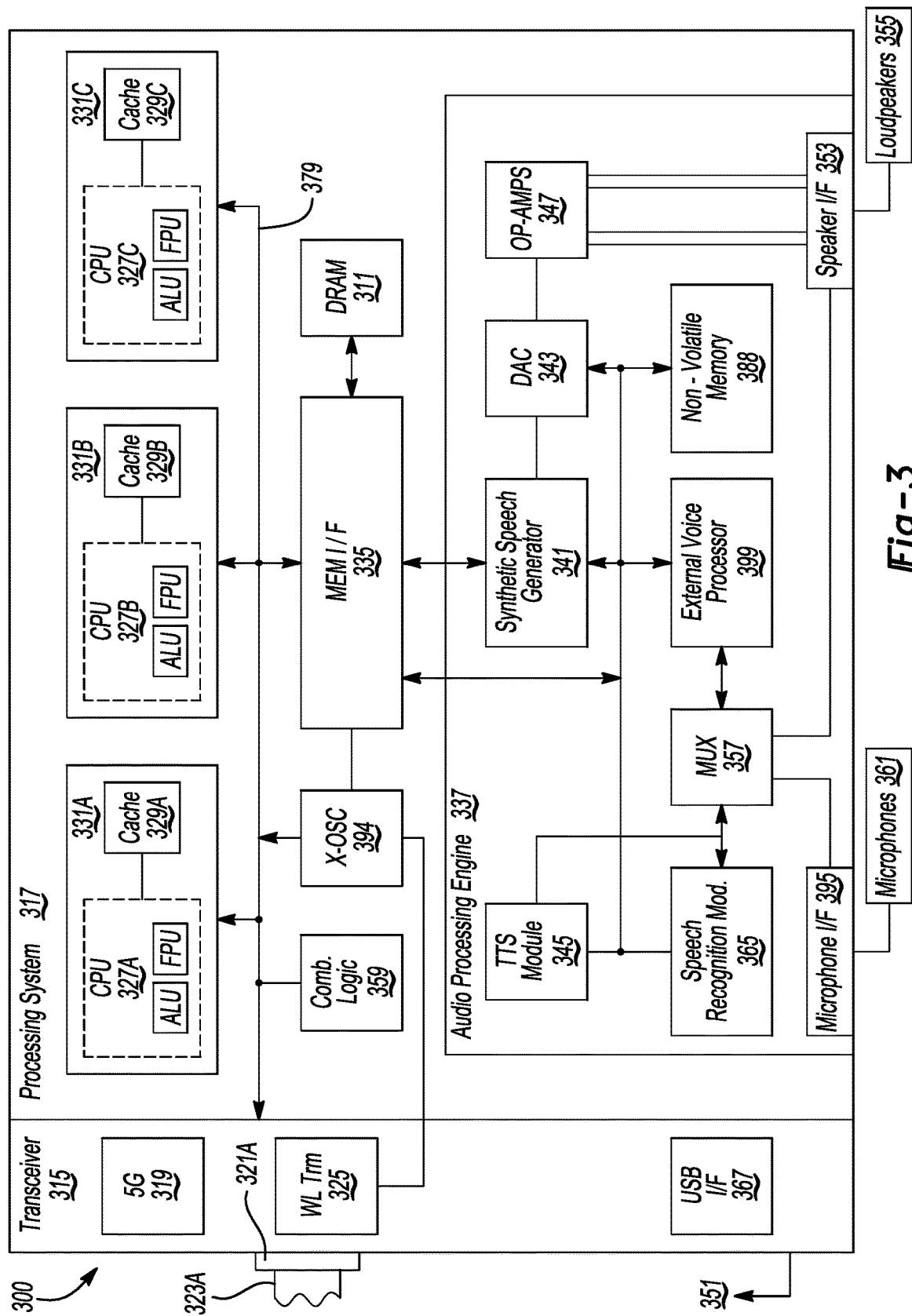
FIG. 3 is an exemplary circuit diagram for describing a processing system and transceiver embedded in a body of the vehicle along with an audio engine, with needed portions of the microphone and loudspeakers made available to the cabin.

Referring still to FIG. 1, one of the roadways conspicuously includes a crosswalk 110. In various embodiments, the vehicle cameras (not visible) may sense the crosswalk pattern and immediately ascertain that it is in an area that may include pedestrians. In addition, actual pedestrians, including the jogger in the crosswalk wielding mobile device 122 (e.g., a smartphone) may be independently detected on the road by the vehicle 120, by virtue of the vehicle's cameras, proximity detectors, acoustic detectors, or some combination thereof. The jogger's mobile device 122 may also be using electromagnetic signals 116 to transfer data to and from the vehicle 120. For example, the jogger may download and install an application that is designed to allow the mobile device 122 to communicate directly with the vehicle. In an embodiment, the mobile device's transmission using the signals 116 to the vehicle 120 (via an appropriate antenna 351 as shown in FIG. 3) may be received by the vehicle 120 and used by the processing system of the vehicle 120 to track the jogger's movements for determining whether the vehicle 120 is within an acceptable distance away from the jogger, and otherwise, to alert the driver, jogger (e.g., using the horn) or take immediate remedial action if needed.

Pedestrian 106 appears to be casually walking his dog across the street. Here again, pedestrian 106 represents another risk of a vehicle-pedestrian incident. The processing system may accordingly take into account the pedestrian with mobile device 122, the pedestrian 106 with the advancing dog, and the pedestrian 108 playing with a ball near the road next to the wall. In aspects of the disclosure, the processing system uses its sensors as well as information from other sources to make a holistic determination of an overall risk level, and the best remedial measures beyond merely alerting the driver, if they are needed. As an example, while pedestrian 108 appears to be out of the way on a walkway adjacent the road, the pedestrian 108 may behave suddenly in an anticipated way, such as by rushing out to the road to retrieve a lost ball, while being oblivious to the vehicle 120 if his or her eyes are on the ball. As such, there is some non-zero risk that pedestrian 108 may suddenly run out into the street to chase a runaway soccer ball. The processing system of the vehicle 120 takes each of these factors into account, and other factors (such as a sudden storm forecasted by a weather entity and conveyed to the vehicle 120 over a wireless network connection; roadwork in the vicinity; or a pedestrian riot on the next block). The processing system 120 may build a model using various numerical values of the PHL in or near real-time. The model also accounts for the speed and direction of vehicle 120, and given the relatively dense number of pedestrians in a confined area, the model may integrate the collective information to formulate PHL values and determine in or near real time whether a PHL threshold value is crossed, such that remedial measures may be taken, either by warning the driver via visual, acoustic, haptic, or other feedback or by initiating one or more urgent maneuvers to avoid an imminent pedestrian strike.

Figure 2:
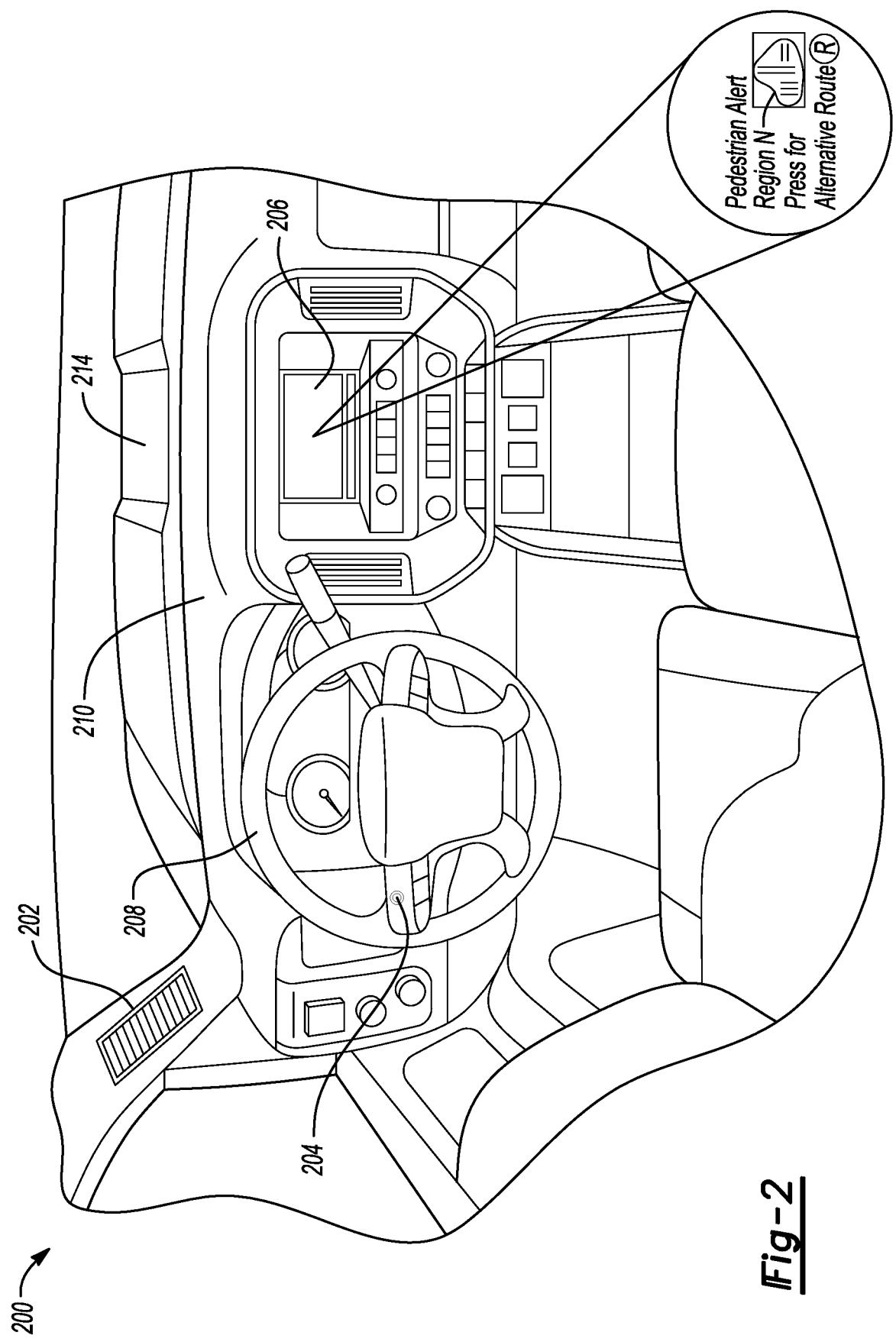
FIG. 2 is an illustrative diagram of a vehicle cabin including a vehicle body, a display for use by a pedestrian avoidance system, and other interior features that may be used by the pedestrian system.

In various embodiments, the vehicle 120 of FIG. 1 may combine in-vehicle hardware such as a sensor or an array thereof, network access to other vehicles and to one or more data sources (whether public data sources or private sources used to transmit wireless signals to the vehicle identifying inclement weather in or near the region of the vehicle 120, events such as outdoor concerts, protests, or a throng of pedestrians up ahead of the vehicle regardless of reason, a collision, roadwork, etc.), and information from other vehicles (via a similar system) or pedestrians (via a mobile device 122) of the existence of pedestrians in sufficient proximity to the approaching vehicle as to constitute a risk of an incident. From this data, the processing system may execute code corresponding to its suite of predictive software to determine the risk factors relevant to the assessment during a relevant time period. Exemplary risk factors may include, but are not limited to:

estimated density of pedestrians nearby, detected by on-vehicle sensors and third party technology implemented on the vehicle or present in the region in which the vehicle is driving or is approaching the vehicle pedestrians detected in the immediate vicinity of a vehicle by sensors or cameras relative likelihood of pedestrian activity near certain zones, regions, areas, or time periods (e.g., sporting venues, or on holidays, etc.)

inclement weather erratic driving behaviors/dangerous habits that affect proper handling of vehicle factors relevant to risk of a vehicle pedestrian incident FIG. 2 is an illustrative diagram of a vehicle cabin 200 including a body 214, a display 206 for use by the pedestrian density and proximity recognition (PDPR) system described herein, and other interior features that may be used by the PDPR system. The PDPR system (FIG. 3) may include a processing system and related circuitry housed in the vehicle interior, such as within a portion of the body 214 of the vehicle, such as behind the dashboard 210. In one exemplary embodiment, the processing system that executes the features, functions, and suite of algorithms of the PDPR may be included in an ECU within the body 214. It should be noted that the body of the vehicle may include an at least partially enclosed space in which electronics may be securely housed. As an example, the display 206 may be a multi-function display in which the PDPR system is one such function, with other functions including an interface for radio or Bluetooth, a navigation system, and the like. To this end, the display 206 may include a touch pad in which PDPR-specific icons may be displayed for selecting inputs, and output data may be visually displayed to the driver. Thus, the display 206 may act as both an input and output device. In other embodiments, the display 206 may be larger and extend across a greater length of the dashboard 210, potentially including multiple windows that are used as part of an infotainment system. The infotainment system may include dedicated screen(s) for the PDPR system, or instead the screens may be dynamically changed in order of priority, or some other criteria. In some cases, in lieu of a touchpad, physical buttons may instead be used to respond to requests, alerts, or other instructions on the display 206. Thus, in some configurations, the input may include dedicated buttons, switches, actuators, etc., located on the dashboard 210 adjacent the output screen, or on the steering wheel 208 or otherwise. In one embodiment, the processing system may be located behind the dashboard in an electronic control unit (ECU). In future embodiments involving the so-called "software-defined vehicle," for example, the PDPR system may implement a larger part of its features and functions as executable code on the relevant processor(s).

Referring still to FIG. 2, and as shown by the call-out for easier reviewing, the display 206 has identified a "Pedestrian Alert Region", meaning that the vehicle is heading toward an area that may include a region of a relatively high density of pedestrians that are on or at the edge of the roadway for some reason, or that otherwise expect to be within close proximity of the driver. One of the options depending on the value of the PHL (described below) is simply to suggest one or more alternative routes to the driver, thereby avoiding that particular risk altogether. In this example, a circled "R" icon is shown to allow the driver to consider one or more detours or alternative routes that avoid the anticipated congregation of pedestrians somewhere in front of the vehicle. A map may be shown, which may in one mode illustrate the upcoming pedestrian distribution, if available, or in another mode may illustrate the details of each alternative route.

The vehicle may include a microphone 204 to capture the content of speech of the driver or other vehicle occupants. In the embodiment shown, microphone 204 may be embedded within the steering wheel 208 (or the dashboard 210 or vehicle roof, etc.) and used to capture the speech of the driver, such as when the driver is verbally responding to requests from the PDPR system. Other microphones may be distributed throughout the vehicle cabin as needed. The specific location of the one or more microphones may vary. Similarly, the communications from the PDPR system need not be merely visual via the display 206. Instead, they may be acoustic, haptic, or a combination thereof. For example, using microphone 204, the driver may issue queries, commands, instructions, and data responsive to PDPR system prompts. In like fashion, the PDPR system need not limit its communications to the driver to the content of display 206. For example, in some embodiments, the PDPR system may be programmed to communicate pedestrian-related information, including more urgent recommendations, to the driver via a synthetic voice playback performed over one or more loudspeakers, such as loudspeaker 202. To this end, the PDPR system may be programmed to use synthetic speech generation and the appropriate audio hardware (FIG. 3) to generate requests or instructions to the driver, such as when the system is alerting the driver to partially hidden pedestrians near the roadway. The PDPR system may also be equipped with voice recognition hardware and software to enable the system to comprehend the responses of the driver, which may include additional questions concerning the location of the pedestrian, or the like.

FIG. 3 is an exemplary circuit diagram for describing a portion of the PDPR system 300 that includes processing system 317, audio processing engine 337 and transceiver 315 embedded in a body of the vehicle, with needed portions of the microphone(s) 361 and loudspeakers 355 illustrated for use in the vehicle cabin. In general, the processing system 317, whether implemented as a single piece of hardware or whether distributed across different portions of the vehicle, may play a significant role of the PDPR system 300 in executing the predictive algorithms for analyzing and identifying the presence of the pedestrian risks, their relative magnitudes, and the different countermeasures to employ or attempt in view of the determined PHL values. For purposes of this disclosure, a countermeasure may be defined as any action to counteract a danger, threat, or risk. Different tiers of countermeasures may be used to identify actions in response to threats or dangers of different levels of severity.

While the PDPR system 300 is illustrated as a single module, in actuality one or more of these structures may be distributed through various regions of the vehicle or transport structure. In some embodiments, the PDPR system 300 may be included as part of one or more electronic control units (ECUs) of a vehicle. The PDPR system 300 includes a processing system 317, which may be used to execute code and instructions, and to process signals using hardware components, for realizing the functionality of the PDPR system and its related functions described herein. Processing system 317 may include processors 331A, 331B, and 331C, for example, although in other embodiments a single processor may be used. Processor 331A may include central processing unit (CPU) 327A. CPU 327A may further include an arithmetic logic unit (ALU) and a floating point unit (FPU), as shown. CPU 327A may be coupled to cache memory 329A for reliably storing frequently used data and instructions. Similarly, processing system 317 may include processor 331B. Processor 331B may include CPU 327B, which in turn may include an ALU and an FPU, along with other hardware elements and combinational logic structures depending on the specific implementation. CPU 327B may also be coupled to cache memory 329B. In various embodiments, cache memory 329B may be included within CPU 327B. In some configurations, the processing system 317 may include a plurality of levels of different cache memory elements.

Processing system 317 further may include processor 331C. Processor 331C may include CPU 327C, which may include an ALU and an FPU (among other elements), as shown. Coupled to CPU 327C is cache memory 329C. While three processors 331A, 331B, and 331C are shown in FIG. 3, in practice the processing system 317 may include one or more processors. The processors 331A, 331B, and 331C may be configured to execute code relating to the various functions of the PDPR system.

Referring still to FIG. 3, processor 331A, processor 331B, and processor 331C may each be coupled to a memory interface circuit 335 via bus 379. Bus 379 may include a variety of metallic traces in a printed circuit board and/or wires or cables for transferring information between components of processing system 317 with components of audio processing engine 337 and with components of transceiver 315. The memory interface circuit 335 may constitute a northbridge and southbridge chip or it may constitute a single integrated circuit using different protocols depending on the implementation for efficiently coupling each of the processors to DRAM 311 and other destinations using bus 379. Using bus 379, memory interface circuit 335 may perform high-bandwidth exchanges of data and instructions between dynamic random access memory (DRAM) 311, the processors 331A, 331B and 331C, non-volatile memory 388, multiplexer (MUX) 357, transceiver 315, and various other example modules of the audio processing engine 337. Audio processing engine 337 is coupled to the processing system 317 via some portions of bus 379, and the two components may be coupled to the microphones 361 and loudspeakers 355—in addition to the remaining hardware components in the audio path of the audio processing engine 337—to receive and interpret human voice through the microphones 361 and to generate synthetic speech for reproduction via loudspeakers 355.

It will be appreciated that the terms "processing system" and "processor" for purposes of this disclosure may, but need not, be limited to a single processor or integrated circuit. Rather, they may encompass plural or multiple processors, configured in a variety of possible physical circuit configurations. Non-exhaustive examples of the term "processor" include (1) one or more processors, in a vehicle for PDPR system implementations that collectively perform the set of functions relevant to a PDPR system and that interface with other components as governed by the relevant specifications of the governing suite of algorithms and hardware, and (2) processors of potentially different types, including reduced instruction set computer (RISC)-based processors, complex instruction-set computer (CISC)-based processors, multi-core processors, etc.

The processing system 317 may further include memory (e.g., dynamic or static random access memory (e.g., DRAM 311 or "SRAM")) as noted above. While the embodiment of FIG. 3 shows that processing system 317 is coupled to and cooperates with audio processing engine 337, which in turn includes non-volatile memory 388, in other implementations the different modules may be partitioned in a different manner without departing from the scope and spirit of the present disclosure. In some embodiments, the processing system 317 may be coupled to solid state drives, magnetic disk drives and other hard drives. The processing system 317 may also incorporate flash memory including NAND memory, NOR memory and other types of available memory. The processing system 317 may also include read only memory (ROM), programmable ROM, electrically erasable ROM (EEROM), and other available types of ROM. The processing system and the operating system and other applications relevant to the PDPR system 300 may be updateable, wirelessly via a network or otherwise. As noted, the memory (e.g., DRAM 311) in the processing system 317 may further include one or more cache memories, which may also be integrated into one or more individual processors/central processing units (CPUs) as L1 caches. The caches may be embedded within the processor, or they may be discrete devices, or some combination thereof.

The processing system 317 in some implementations may include a system-on-a-chip (SoC), or more than one SoC for performing resolute or distributed functions. Thus, as noted, the processing system 317 in this disclosure may include hardware implementations such as digital signal processors (DSPs), application-specific integrated circuits (ASICs), field programmable gate arrays (FPGAs), discrete combinational logic circuits, and the like. In these configurations, the processors may be coupled together via different circuit boards to form the processing system 317. In other embodiments, the processors and other functional modules may be combined on a single printed circuit board or integrated circuit device.

A crystal oscillator (X-OSC) 394 is shown attached to the memory interface circuit 335 and the three processors 331A, 331B, and 331C. The crystal oscillator (X-OSC) 394 may be used for clock operations, such as in the timing of received or transmitted signals. Separately, combinational logic 359 is shown for performing various digital hardware tasks. Data may be exchanged between the combinational logic 359 and the other components of the processing system 317 using bus 379. The combinational logic 359 may include one or more encoders, decoders, multiplexers, demultiplexers, Boolean logic circuits, and other digital hardware elements. In some embodiments, the combinational logic 359 may be realized as including one or more field programmable gate arrays.

The audio processing engine 337 may perform relevant tasks identified by the processing system 317 for processing various components used in PDPR systems including, for example, forming output and input audio paths for respectively transmitting and receiving audio synthetic and driver-based data streams, respectively. It will be appreciated that in many architectures, the functions executed by the audio processing engine 337 may alternatively or additionally be executed by other portions of the processing system 317. These other portions may include, for example, one or more of processors 331A, 331B, and 331C, and combinational logic 359. Thus, in various embodiments, portions of audio processing engine 337 may be physically integrated with other portions of the processing system 317.

The audio processing engine 337 in the embodiment of FIG. 3 includes a text-to-speech ("TTS") module 345 for converting text generated by one or more of the processors 331A, 331B, and 331C into analog signals that may be amplified and output via loudspeakers as a synthetic voice for a user to listen and interpret. To perform this task, text-to-speech (TTS) module 345 may have built therein a digital-to-analog converter (DAC) for converting a digital text signal into an analog audio signal. In an alternative embodiment, TTS module 345 may rely on a separate DAC 343, or a plurality of such DACs, to accomplish a similar function. In addition, the TTS module 345 may pass the output electrical speech signal to a synthetic speech generator 341, in some embodiments before the signal from the TTS module 345 is converted into analog form. The synthetic speech generator 341 may receive the audio information from the TTS module 345 and may use the speech data to assign a set of parameters (e.g., a vocal frequency, dynamic range, etc.) that represents an identifiable speech signature for output to the loudspeakers 355. The parameters that form the signature may be used to reproduce recognizable speech when the signal is passed through the loudspeakers 355. For example, the synthetic speech generator 341 may forward the output data stream to an external voice processor 399 for processing and conditioning the data stream before the data stream is passed to the multiplexer (MUX) 357. For example, the external voice processor 399 may perform amplification, filtering, noise-shaping and other audio processing functions.

The DAC 343 may output an analog version of the audio signal to op-amps 347 and/or to other amplifiers for boosting the signal power. The amplified signal may then be passed via the speaker interface 353 for miscellaneous signal conditioning out to one or more loudspeakers 355 in the vehicle cabin 200 (FIG. 2) for outputting synthetic speech including instructions, requests for clarification, and other data relevant to an ongoing PDPR session. In other embodiments, such as where the TTS module 345 already includes a synthetic speech generator function, a DAC, amplifier, and potentially other components, TTS module 345 may forward the output speech signal via MUX 357 to output the speech signal using speaker interface 353 and loudspeakers 355. The loudspeakers 355 (which may include a single loudspeaker in some embodiments) in turn output the synthetic speech, such as an alert to the driver of a discovered pedestrian density risk in the road ahead followed by one or more recommendations.

In a similar manner, the driver may use one or more microphones 361 to input human speech to the PDPR system. For example, the driver's voice may be converted by the microphone 361 into electrical signals representing an input audio stream. The electrical signals representing the speech may pass through a microphone interface 395 and may be transmitted to MUX 357. MUX 357 may thereupon forward the received electrical speech signals to a speech recognition module 365. Speech recognition module 365 may attempt to interpret the input speech using voice biometric procedures or other patterns. Speech recognition module 365 may perform a variety of acoustic-related functions looking for unique patterns, using reference models, and processing the input signals to comprehend the driver's acoustic input. It will be appreciated that in other configurations, the speech recognition functions performed by speech recognition module 365 may additionally or alternatively be performed, in part or in whole, by other components of processing system 317, including by one or more of the processors 331A, 331B, and/or 331C. The translated input data stream originating from the driver may be passed on via bus 379 to the processing system 317 and its corresponding elements (including combinational logic 359) for analysis and determination of an appropriate response.

During regular use of the PDPR system 300, when audio data is received from the microphones 361 and input to the speech recognition module 365 via MUX 357, the speech recognition module may be used for translating the data stream as discussed above. In various embodiments, the speech recognition module 365 may also use voice biometrics or the driver's spoken words at initial setup to authenticate the audio stream.

Coupled to the processing system 317 and the audio processing engine 337 is transceiver 315. In general, transceiver 315 may be used for (1) receiving incoming sensor data from different sensors throughout the vehicle, (2) exchanging wireless transmissions with other vehicles and mobile devices, e.g., for receiving intel relating to pedestrians in a region of interest, or offboarding the analyses of the PDPR system to other vehicles and pedestrians (via the vehicle communication system, or for pedestrians, via a smartphone or other mobile device, (3) providing alerts and other information directly to the driver using visual data intended for the display 206 (FIG. 2), and also prompting the driver to make various input selections, and (4) particularly in more imminent risk situations involving an impending pedestrian strike, enabling the processing system to take proactive control of portions of the vehicle in or near real time to avoid the looming catastrophe. The types of actions in (4) may include, for example, applying the brakes, maneuvering the vehicle to avoid hitting a person, decelerating the vehicle, and the like, before reverting the control back to the driver.

Referring to antenna 351 of the transceiver 315, the transceiver 315 may receive external data streams from other vehicles or transport structures, or pedestrians via their mobile devices. To process the incoming data, the transceiver 315 may be equipped with different types of network interface modules. These include, for example, 5G module 319 for receiving and processing 5G wireless signals. 5G module 319 may demodulate the signal to baseband form, and may digitize the signal prior to sending to the processing system 317 using principles from the wireless 5G specification (or a predecessor to the 5G specification). Antenna 351 and 5G module 319 may also be used by the transceiver 315 to encode data streams from the processing system 317 and to transmit the data streams using 5G technologies to other compatible vehicles.

In other embodiments, as noted, the vehicle may be equipped with other predecessor wireless transmission capabilities to 5G, including 3G and 4G, as well as proprietary network technologies that may be used by the manufacturer of the vehicle. Wireless transmit module 325 may include the needed processing circuitry to both transmit and receive information between the processing system 317 and other vehicles or pedestrians. It is noteworthy that in some cases the PDPR system 300 may have performed recent analyses regarding a particular region and stored that information in non-volatile memory 388, and then later does the processing system 317 offboard this information via the wireless transmit module 325 and antenna 351 to other vehicles. It is also noteworthy that additional modules may be present to enable the PDPR system 300 to transmit and receive data to and from external sources, as the case may be. For example, a manufacturer may use one or more external resources for transmitting data to its fleet of vehicles to provide information via the transceiver 315 regarding pedestrian congregations, weather, calendar events, and other materials.

In addition, the vehicle may contain interfaces such as USB interface 367 for enabling third party sensors to be used in conjunction with the transceiver 315. Bluetooth modules or various implementations of Wi-Fi modules may similarly be used in certain circumstances to enable connectivity to third-party USB devices, as an example. In some circumstances, specific third party devices may be plugged into the USB interface 367 to enable the third party device to provide relevant data to the PDPR system 300. For example, various types of third-party devices may use Bluetooth data or cellular-based data to render population estimates and, in this example, to communicate the population estimates to the PDPR system 300. In other embodiments, the third party sensors may instead reside in remote locations (e.g., in roadside systems), and may operate such that the PDPR system 300 uses its wireless networks (Bluetooth, LTE, etc.) to elicit pedestrian population data from these third-part sensors Referring still to FIG. 3, transceiver 315 may also include one or more connections to other parts of the vehicle to enable the processing system to receive sensor data and to enable, when needed, the PDPR system 300 to take proactive actions. In the latter case, the transceiver 315 (or other dedicated circuits) may have connections to various control functions of the vehicle, such as braking features, acceleration/deceleration functions to avoid a pedestrian, horn access for warning pedestrians, and other such connections that enable real-time mitigation of risks associated with the vehicle colliding into a pedestrian.

It is noteworthy that in the embodiment of FIG. 3, transceiver 315 is used for example to connect the PDPR system 300 to peripheral parts of the vehicle in order to receive relevant data from active sensors and also to take temporary control of the vehicle to avoid pedestrian encounters. In other embodiments, these functions may be performed differently. For example, in some embodiments where the PDPR system 300 is not centralized but is distributed across different locations in the vehicle, the connections with sensors and with vital vehicle control systems may also be distributed. Regardless of whether the connections are distributed, in part or in whole, or more centralized, each of these configurations are intended to fall within the spirit and scope of the present disclosure.

Referring back to transceiver 315, the PDPR system 300 may use conductors, metallic traces, cables, wires, or other suitable conductors to various sensors in the vehicle. In some embodiments, the sensors may themselves be wireless and may communicate with the PDPR system 300 via an antenna. It should be noted that the sensors may be reasonably considered part of the PDPR system 300, and the transceiver 315 is present to make the appropriate connections. One such example is cable 323A, which includes cable interface 321A. In some embodiments, cable 323A may include a plurality of insulated conductors which are configured to send data to the processing system 317 for use by the PDPR system 300 in determining PHL values and performing other tasks related to its system. Cable interface 321A may include a plurality of digital or analog circuits for processing the incoming data. The data may then be transmitted to the processing system 317 for further analyses, discussed below.

As another example, cable 323A may instead include one or more conductors that ultimately are routed to various control systems responsible for moving, maneuvering, and braking the vehicle. Similarly, cable interface 321A may include the requisite digital and analog circuitry for transmitting data streams from DRAM 311 or from one or more of the processors 331A, 331B, or 331C. Cable interface 321A may include a multiplexor for selectively transmitting signals from different sources when needed, for example. Cable interface 321A may also be configured to process instructions from the processing system 317, such as which transmissions are a priority and should be transmitted first. In some embodiments, a number of cables interfaces similar to cable 323A and interface 321A may be deployed. Also, in some embodiments, cable 323A may be another type of conductor. Further, in some embodiments, cable interface 321A may be coupled to X-OSC 394 or to its own local clock for help with proper clock recovery when receiving signals, or for providing the needed timing when transmitting signals.

In short, the transceiver 315 of FIG. 3 enables the PDPR system 300 to receive data from the relevant sensors in the vehicle, including the cameras, proximity sensors, braking sensors, motion detectors, pedestrian sensors, and other sensors that may be built into the vehicle as part of the overall PDPR system 300 and potentially other systems. The transceiver 315 may also be used to receive navigation data from the GPS module in the vehicle. In addition, the transceiver 315 may be configured to offload the relevant results of its analyses to other vehicles that may need the information. The transceiver 315 may receive wireless information and alerts from pedestrians via mobile devices, just as it may send data to the smartphones of pedestrians to alert them of vehicles in the vicinity, the results of their analyses, etc. In addition, the PDPR system 300 may use transceiver 315 to apply the brakes and to quickly maneuver away from a pedestrian to avoid an imminent and catastrophic pedestrian strike. The transceiver 315 may also be coupled with the display, thereby enabling the processing system 317 to provide visual output data to the driver as well as input prompts. The driver may be equipped with a haptic device, e.g., on the steering wheel. The transceiver 315 may use the haptic device to provide fast alerts. Acoustic warnings may be applied, as noted above, using the loudspeakers. Thus, regardless of the physical configuration of the connections and whether transceiver 315 is implemented as a single component or multiple distributed components, the transceiver 315 may implement a critical link between the processors and sensors, between the processors and other vehicles, between the processors and other sources (e.g., weather data, event data), between the processors and pedestrians (via the mobile devices of the pedestrians), between the processors and other vehicles (e.g., to offload valuable PDPR data for an area, and between the processors and main vehicular control functions (e.g., to enable the PDPR system 300 to brake the vehicle or turn the vehicle to avoid an imminent pedestrian strike). In other embodiments, these functions may also be partitioned using different modules.

As noted, the risks associated with hazardous conditions involving pedestrians include the estimated density of pedestrians nearby, which may be detected by on-vehicle sensors (e.g., data cameras or motion sensors, whether by itself or fed into a pedestrian detection algorithm used by the PDPR system 300). The executable code may be capable of identifying pedestrians versus other moving or non-moving entities. The PDPR system 300 may reproduce in a two-dimensional or three-dimensional (3D) region defined in a frame buffer or other memory the plurality of identified pedestrians and their positions relative to the vehicle. The data in turn may be further used by the predictive code. For example, the processing system 317 may be able to ascertain in real time and to a good level of accuracy the distance of the pedestrians (and bicyclists in some embodiments) from the vehicle, and their directions relative to the vehicle. A related risk factor assessed by the PDPR system 300 is the likelihood of pedestrian activity near designated regional zones, such as at relevant times when the vehicle may be in the immediate vicinity. In addition to the data elements received from the various vehicle sensors, external sources networked to the vehicle may provide important points in time, including outdoor concerts, sporting events, marathons, and similar events that may be highly pertinent to the vehicle's PDPR analyses. Similarly, as noted, inclement weather, closed roads, sudden detours, poor navigation conditions due to sandy roads, and other factors which may compromise the maneuverability of the vehicle in regions near pedestrians may be analyzed as relevant risk factors. Erratic, aggressive or irregular driving behavior or habits of the driver may also be taken into account and brought to the driver's attention for reducing overall risk, including pedestrian-related collisions.

In addition to the above risk factors, the PDPR system 300 may take into account data from third party technology. As noted, third-party sensors/transmitters may be strategically placed in different geographical regions (or may be in motion, such as in other vehicles) near major thoroughfares to use Bluetooth, cellular technology, along with built-in hardware for estimating individuals using pattern recognition technologies for the purpose of determining pedestrian populations in different regions. The vehicle may also access this data via its wireless connections for use in the predictive algorithms of the PDPR system 300.

In various embodiments, the model used by the processing system 317 aggregates and tabulates each data point to reach a PHL between PHL 0 (insufficient or no increased risk) and PHL 3 (imminent collision risk), in integer increments. Based on the PHL, the PDPR system enables the vehicle to employ countermeasures to proactively avoid or mitigate incidents. In certain cases, PHL may be used to identify cyclists in addition to pedestrians. Continuing with this exemplary embodiment, at PHL 0, no action is taken. PHL 1 countermeasures apply to situations of increased pedestrian density, but in which most risk factors are not elevated. Example countermeasures may otherwise be straightforward and include alerting the driver with visual or audio cues, and slightly increasing the sensitivity of on-vehicle sensors. At PHL 2, moderate risk factors may be detected (e.g., dense pedestrian population in close proximity) and countermeasures may include limiting speed, alerting the driver via haptic feedback, adjusting lighting, and further heightening sensitivity of on-vehicle sensors. At PHL 3, when a collision is deemed to be imminent with a high degree of confidence, countermeasures may include automatic braking and honking, and potential automated counter-maneuvers. When appropriate, some PHL 1, 2, and 3 responses may trigger concurrently, with output behaviors collectively provided. Risk data may also be offboarded to other vehicles and pedestrians nearby, creating a shared awareness of risks in the area. When a vehicle registers data that merits a PHL response, other enabled vehicles nearby may receive an alert on the IHU about an upcoming pedestrian risk, even if they have not yet reached that location. Should a vehicle detect erratic or irregular driving in an increased pedestrian zone, or a driver has failed to respond with corrective action to PHL countermeasures, eligible smartphone users in the area may be alerted, in an application, that an oncoming vehicle presents a risk of harm to those pedestrians.

Figure 4:
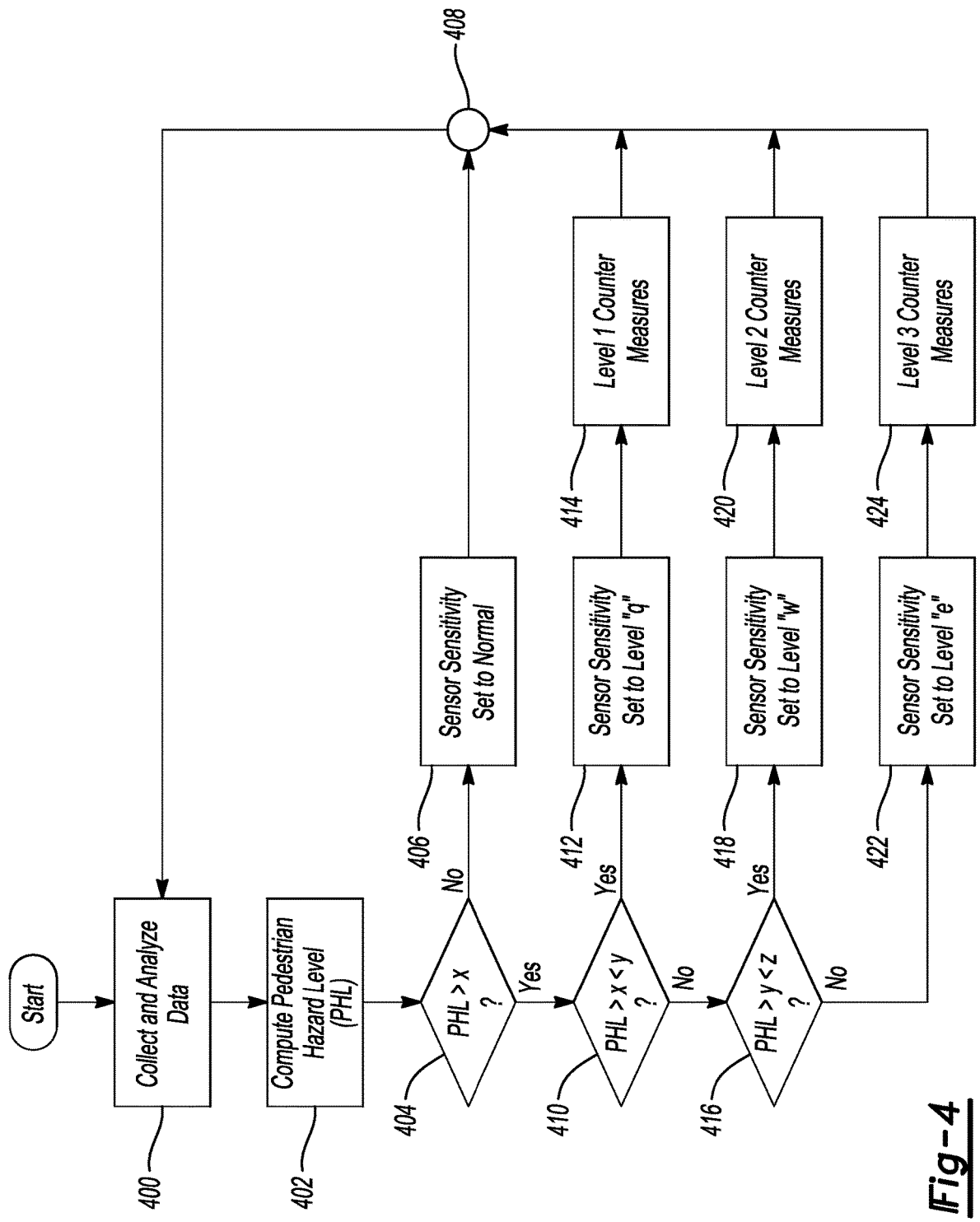
FIG. 4 is an illustrative flow diagram describing an example algorithm used by the processing system to execute a pedestrian hazard level (PHL)-based system and for employing countermeasures where applicable in accordance with various embodiments.

FIG. 4 is an illustrative flow diagram describing an example algorithm used by the processing system to execute a pedestrian hazard level (PHL)-based system and for employing countermeasures where applicable in accordance with various embodiments. It will be appreciated that FIG. 4 represents just one embodiment involving a few PHL values and potential corresponding countermeasures, and that depending on the implementation, one or more different countermeasures may be taken.

The logic blocks in FIG. 4 may be taken by the processing system 317, the PDPR system 300 more generally, and it may rely on the use of data sensors, third party sensors, vehicles in the vicinity with wireless connections to the PDPR system 300, and external data sources of the type discussed above that assist in providing information to the PDPR system in various regions. Other hardware and software elements not specifically shown may be used in the PDPR system as well. FIG. 4 shows a representation of the model aggregating and tabulating received data to determine a PHR. In this example, the PHR is between 0 and 3, although other models may use greater or fewer numbers to achieve different granularities.

Beginning at the start element, at logic block 400, the processing system collects and analyzes the received data from the various sources described above. For example, having received data from the vehicle's forward collection sensors, automatic braking activities, and light intensity adjustments, among many others, the processing system may collect and analyze the results of the information obtained from these sensors. Analyses of the different data types may be performed using different subroutines and application programming interfaces (APIs), in cases where the predictive algorithms are predominantly software-based, for example, and run as executable code on one or more processors 331A, 331B, 331C, etc. of processing system 317. The collection and analyses period performed by PDPR system 300 may be continuous or segmented. In a continuous architecture, for example, the entire analyses may be run prior to results being disseminated. This strategy is often optimal when the processing system recognizes potentially imminent risks that need to be acted upon. In other configurations, the processing system may segment the analyses. Segmenting may enable different chunks of data to be analyzed in parallel, with additional data potentially coming in from other data sources. The new data may serve to refine or provide greater accuracy than if less data points are relied upon. Also, it is possible even in segmented architectures that periodic countermeasures may be taken while the underlying analyses may continue to refine the results.

At logic block 402, the processing system may use one or more of its predictive programs to compute a PHL that is based at least in part on the data collected and analyzed in logic block 400. Like in the above example, the PDPR system has identified four integer numerical values which may be used as PHL thresholds, for example, to determine whether the requested data, when analyzed and computed, meets one or more of them. Initially when the processing system 317 analyzes the data, it may be determined whether the value of PHL (below) meets the first PHL threshold, as shown in logic block 404. In some embodiments, the threshold PHL values may be dynamically updated and changed to comport with changes to the data. The PHL values may also incorporate relevant data from other sources to modify the threshold values.

Referring back to logic block 404, if the PHL value determined on the fly is not numerically large enough to be ≥X, then at logic block 406, the sensor sensitivity may be set to normal, no action is taken at circle 408, and driving may continue in a routine manner. If, however, the processing system determines that the PHL meets the X threshold, then control may pass to logic block 410. It should be noted for purposes of this disclosure that when a value is determined to "meet" a threshold, this qualifies for purposes of this disclosure to also mean, where applicable, that the value may meet or exceed the threshold at issue. Thus, in logic block 404, provided that the value of PHL≥X when measured, the condition for meeting the threshold PHL value X is made. If, by contrast in logic block 404, the answer is "No" to whether PHL≥X, the sensor sensitivity may be set to normal as described above.

If at logic block 410 when the assessed value of PHL fails to meet the lowest nominal value, as noted above, the processing system 406 may set the sensor sensitivities to normal (if not already in that configuration). In a feedback loop 408 in which previous existing elements are taken into account, if needed (for example, subsequent countermeasures succeeded at mitigating a previously recognized risk), then control returns from the circle 408 and back to logic block 400, in which the PDPR system 300 may receive new data streams from the appended data sensors and sources, and the process may be repeated. Circle 408 may represent the various actions automatedly performed by the vehicle. Non-exhaustive examples of prior action at circle 408 include changing the sensitivity of the collision sensors, executing automated braking, and changing lighting conditions (e.g., intensity). For case of understanding, the present embodiment operates under the assumption that no PHL thresholds have yet been established.

The process may be repeated on a regular basis in some embodiments and run continuously in others. In still further embodiments, the process may be repeated when one of the data sources identifies a change of sufficient magnitude. For example, proximity detectors may suddenly detect an anomaly in real time. Different settings may be employed based on the vehicle or transport structure. Sensors may justify actions from automatic braking. In some embodiments, for maximum effect, the computations by the PDPR system 300 may be repeated on a regular basis to ensure that the risk is mitigated, and maximal effective use is made of the collision detection system.

Referring further to block 410 in FIG. 4, the PHL value may exceed X but not the value Y. In this event, referring to logic block 412, the processing system may increase the sensor sensitivity to some selected level "q." The increase may apply to selective sensors or to a broader array. The fact here is that because the estimated value of the PHL exceeds the threshold x in this case, the PDPR system may interpret the data as a pedestrian risk of a certain magnitude. However, in the logic block 412, the increased sensitivity "q" may in some cases represent just a minor increase. In addition, at logic block 414, the processing system may execute Level 1 countermeasures. In one embodiment, level 1 countermeasures (or PHL=1 countermeasures) may apply to situations of increased pedestrian density as noted, but in which most risk factors are not elevated. These countermeasure may be relatively moderate in proportion to the determined risk and may include, for example, alerting the driver with visual or audio cues using the display or the loudspeakers, respectively, using a slightly increased sensitivity in cameras or sensors to search for pedestrians closer to the vehicle, and similar such modern countermeasures. These countermeasures in logic block 414 may be performed at circle 408 before control returns to logic block 400.

If, however, the value of PHL in logic block 410 meets both thresholds x and y, then NO is selected and the processing system may proceed to determine in the next logic block 416 whether the value of PHL is greater than y but less than another target value z. If yes, then at logic block 418, then the processing system has determined that the present PHL value meets another, greater threshold identified as y. Thus, at logic block 418, the processing system may set the sensor sensitivity (ies) up further, such as from level q to level w. If w is significantly more sensitive than q, for example, then the sensors may be much more effective at identifying potential pedestrians up very close, in the region of the vehicle. In addition, at logic block 420, the processing system may implement level 2 countermeasures. In this example, PHL 2 countermeasures may be used to identify cyclists in addition to pedestrians. PHL countermeasure at level 2 may correspond in this example to a moderate risk of pedestrian incidents. For example, the level w may be sufficient for the sensors to identify more dense pedestrian populations in closer proximity to the vehicles, as noted above. At logic block 420, example level 2 countermeasures may include limiting speed, alerting the driver via haptic feedback, adjusting lighting, and further heightening on-vehicle sensors.

Referring back to logic block 416, it may be the case that the PHL value 3 meets each threshold, including both y and z. In this case, a NO is detected and the processing system at logic block 422 may select a level e as the next sensitivity of the vehicle sensors. In addition, the processing system may immediately proceed to logic block 424 to execute level 3 countermeasures. As noted, at PHL 3, when a collision is deemed to be imminent with a high degree of confidence, countermeasures at logic block 424 may include automatic braking and honking. When appropriate, some PHL 1, 2, and 3 responses may trigger concurrently, which is shown by each of the three outputs leading to the circle 408. Also, the sensor information gleaned at logic block 422 may be used in logic block 424 to determine the magnitude and nature of the needed level 3 countermeasures.

Risk data may also be offboarded to other vehicles and pedestrians nearby, creating a shared awareness of risks in the area. When a vehicle registers data that merits a PHL response, other enabled vehicles nearby may receive a wireless alert about an upcoming pedestrian risk, even if they have not yet reached that location. Should a vehicle detect irregular or aggressive driving in an increased pedestrian zone, or a driver has failed to respond with corrective action to PHL countermeasures, eligible smartphone users in the area may be alerted, in an application, that an oncoming vehicle presents a risk to those pedestrians.

While the above countermeasures identified certain exemplary actions that may be taken, this list is not exhaustive and the possible countermeasures in the different levels may in some embodiments be greater. As an example of various possibilities that may be used in conjunction with the disclosure, the below table identifies potential techniques that the PDPR system may use to identify PHL-relevant values based on one or more data sources, sometimes in conjunction with one or more actions, in addition to a non-exhaustive list of possible countermeasures and responses that may be taken based on the identified PHL:

| NON-EXHASUTIVE EXAMPLES OF DATA GATHERING TECHNIQUES FOR IDENTIFYING PHL | |
|---|---|
| 1. Using on-vehicle cameras for pedestrian detection: | Recognize pedestrians in crosswalk ahead<br>Crowds in surrounding area<br>Individuals crossing in front or behind vehicles<br>Individuals exiting vehicles in the vicinity<br>Create density estimates |
| 2. Using Driver behaviors to modify algorithm: | Recognize eye movement / distraction<br>Frequent slowdowns at crosswalks<br>Sensitivity of automatic braking when attention is poor<br>Automatically turn off cruise control and super |
| 3. Generating population estimates: | Bluetooth recognition of population<br>Cellular traffic<br>Increased traffic, vehicles, departure from norms<br>High density areas<br>High noise areas |
| 4. Identifying other risk factors: | Blind spot detections<br>Weather Conditions (e.g., leaves, snow, etc.) |
| 5. Utilizing information uploaded related to location relayed by first responders / police: | Holidays, i.e., "Trick or Treat" data<br>Political/protest events |
| 6. Mapping High incident pedestrian zones (heat maps): | Presence of school zones, crosswalks, bike lanes, construction zones<br>Presence of crosswalks<br>Presence of bike lanes |
| NON-EXHAUSTIVE COUNTER-MEASURES AND RESPONSES | |
| Changing Vehicle Protection Settings / Sensitivity: | Follow Distance<br>Forward Collision Alert<br>High Medium Low sensitivity - levels based on data response<br>Low Level Collision - adjust sensitivity in a slow go, highly dense population<br>Changing contact force threshold<br>Speed Limiter<br>Visual alert IHU<br>Automated re-routing<br>External speakers - notify surrounding pedestrians<br>Adjust Lights, intensity, flash / visibility |
| Increasing sensitivity in poorly lit areas: | Haptic Feedback<br>Recording (theft use case already)<br>V2V - share data out from density estimates |
| Offboarding data to create notification: | Network tie ins<br>Set up geocage hazard |

| -continued |
|---|
| Determine benefit to a pedestrian<br>Change vehicle aspects/back office |

Figure 5:
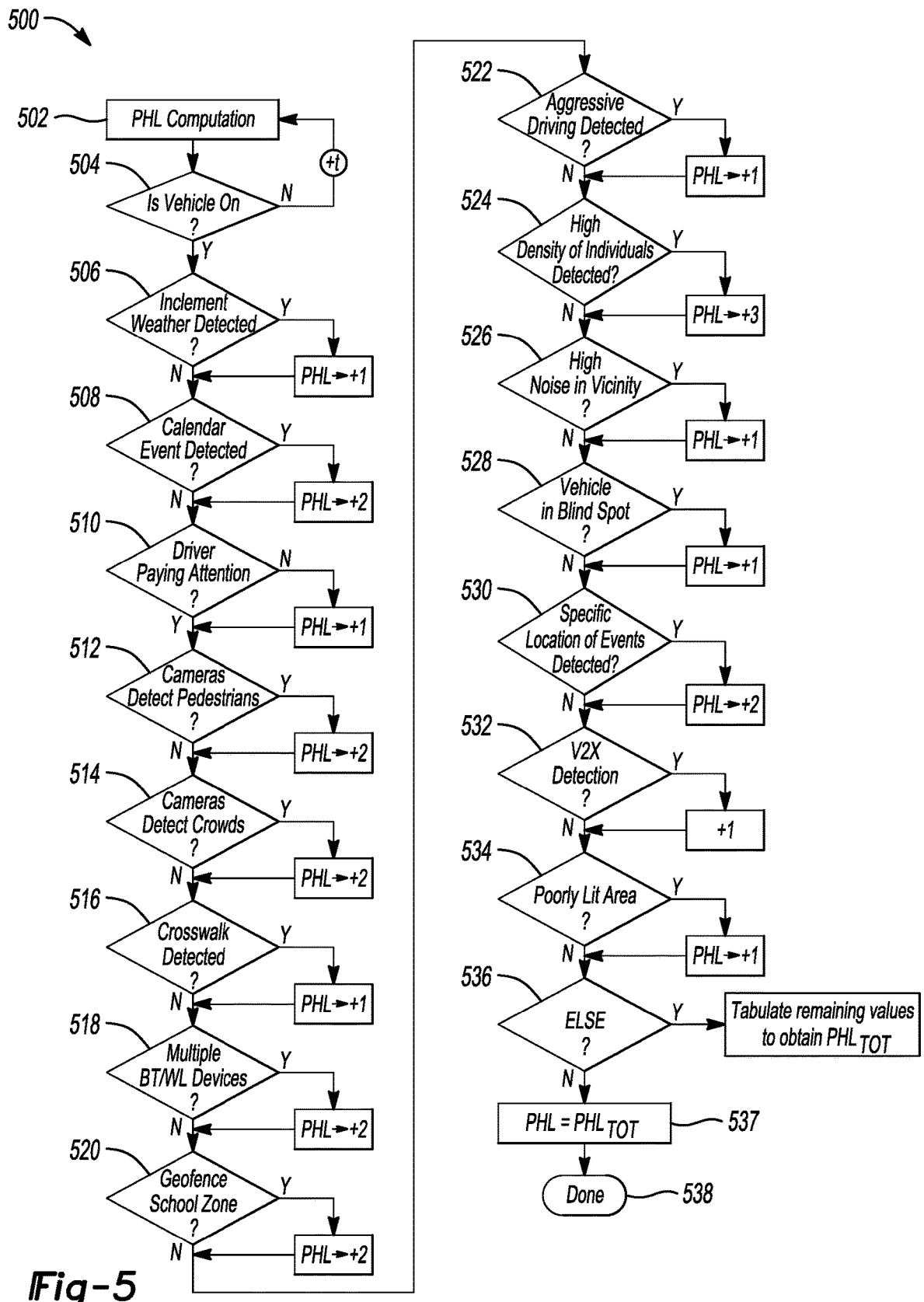
FIG. 5 is an illustrative flow diagram describing an example algorithm used by the PHL system in determining a value of the PHL according to an embodiment.

FIG. 5 is an illustrative flow diagram 500 describing an example algorithm used by the PHL system in determining a value of the PHL according to an embodiment. The elements of FIG. 5 may be performed by the processing system 317, transceiver 315, audio processing engine 337 (FIG. 3) and the various components thereof. The combinational logic 359 may also play a role in one or more of these routines. Beginning at logic block 502, a module is loaded into the processing system for PHL computation. At logic block 502, the processing system may recognize that its functions are unneeded when the vehicle is not in operation on the roadways. If the vehicle is off, the algorithm may engage when it is turned on. Alternatively, a static portion of the processing system 317 such as the combinational logic 359 may periodically check after a time t, as shown. Once the vehicle is in operation as determined by block 504 and depending on the settings given by the driver, the PHL computation may commence as control passes to logic block 506. The processing system 317 may receive network information via the transceiver regarding whether inclement weather is present in areas close to the vehicle or to a route programmed into a GPS. An affirmative detection of inclement weather means that a processing system assigns +1 to the default PHL=0. Otherwise, the presence or absence of various pedestrian activities in the context of a calendar check near the operational vehicle at logic block 508 is ascertained, and if such event(s) are detected, the PHL may be incremented by 2. Thereupon, measuring the rhythm of the vehicle and the traits of the driver from the prior table, it may be determined at logic block 510, whether the driver is paying attention to his or her surroundings. If the processing system determines that the driver is not, it may increment the PHL by +1.

Referring now to logic block 512 of FIG. 5, the processing system may use the video feed data from cameras along with pattern recognition software to determine whether pedestrians are present near the vehicle, in which case the PHL may be incremented by 2. Similarly, at logic block 514, the processing system may extrapolate or otherwise manipulate the camera feed data to determine if the data rises to the level of crowds, and their approximate location. The processing system may increment the PHL by another 2, for instance. Using the camera or other sensor, it is detected at logic block 516 if a crosswalk is present. The presence of a crosswalk may make the presence of pedestrians more likely, so adding another point to the tally is reasonable. Referring to logic block 518 and using the appropriate network components in the transceiver, the vehicle may determine if Bluetooth™ or other wireless devices, such as cellular phones, are present in the area. Because it is more likely than not that each such located mobile device or other phone is associated with a human, the processing system may further increment the PHL count, here by 2. In some embodiments, the magnitude of the count is proportional to the number of devices identified near the vehicle, which in turn is proportional to the total number of pedestrians with such electronics. This example demonstrates that the actual number of points to be incremented may change based on the level of detail of the pedestrian avoidance architecture, or other factors including whether the PHL may be segregated into different zones.

At logic block 520, the processing system may determine whether a geofence school zone is present in the vicinity of the vehicle. The geofence is a visual permitter for a real-world geographic area such as a school, and its detection likely suggests the presence of children or other pedestrians in that region. As such, the PHL may be incremented to account for this awareness by 2 or a similar number. Moving on to logic block 522 of the PHL algorithm, it may be determined, using motion sensors, speed detectors (if equipped on the vehicle) or information from other vehicles or sources whether one or more vehicles in the area are being driven by aggressive or possibly impaired drivers. In this event, a PHL may be incremented accordingly to account for the increased risk to pedestrians.

Referring to logic block 524, an important determination relates to the density of individuals, if determined, in a given region near the driver. The predictive algorithm's code is such that as the sheer number of pedestrians in an area increases, so too does the density of pedestrians in the area and the concomitant risks associated with driving proximate this area. In the example of FIG. 5, the processing system assigns +3 points to the PHL. It is noteworthy that a calendar of events made available to the PDPR system 300 may shed light on this information, as well as motion detectors on the vehicle and other vehicles, cameras, video footage, and the like.

Another technique in logic block 526 that may be useful is using acoustic circuitry in the PDPR system 300 to determine whether loud decibels are registering in the audio range. If so, this has an effect on the likelihood of pedestrians, whether or not seen. Effective countermeasures in addition to slowing down and maneuvering away from the scene may include turning visible lights on to enable the vehicle to be spotted. A point may be added to reflect the likelihood of pedestrians and the nature of the risk.

Referring to the logic block 528, the processing system may determine whether the vehicle is in the blind spot. This may mean that at least certain sensors, as well as the driver's own sensors, will not be able to identify a pedestrian, adding a point to the aggregate PHL. Referring to logic block 530, the specific location of pedestrian-occupied events may be determined in a similar manner to determining the density of individuals. Namely, a calendar of events may identify concerts, protests and other pedestrian-intense activities that may take place near roadways. In addition to these data sources, the cameras and other sensors on the vehicle, along with information from other vehicles, may be equally telling as to whether such events are in the vicinity. The processing system may add 2 to the PHL if such events are detected. Referring to logic block 532 in the algorithm, the processing system may consider the extent to which vehicle to everything (V2X) activity is received or otherwise recognized, such that other vehicles or mobile devices have transmitted information concerning the location of pedestrians. Another point may be added to the PHL. If, in logic block 534, the area happens to be a poorly lit area such that the lack of vision retards sensors from properly locating pedestrians, the uncertainty may cause the processing system to add at least one point to the PHL. The aforementioned module of tallying a PHL value (or more than one value) is exemplary in nature, and other approaches. algorithms and numerical values may be used without departing from the scope of the disclosure. A catchall decision logic block 536 is referenced here to determine if other factors may contribute to the PHL. The total PHL is tallied up, and its amounts may be used in the predictive algorithms to maximize the likelihood of pedestrians in a given area, and consequently to minimize the likelihood of a pedestrian strike.

In other embodiments, the PHL may be further categorized into specific regions, such that different sets of PHL calculations may apply to different areas, potentially with a time limitation regarding the recency of the data as proportional to its reliability. Nonetheless, in various embodiments, a standard may be promulgated that would enable the risk mitigation units to calculate the PHL values in similar ways, such that different sets of PHL values relate to different geographical regions. For the PHL in FIG. 5, the processing system determines that the total PHL in this measurement is equal to the total number tabulated by considering effective and likely ways to identify pedestrians, or the absence thereof. The procedure completes at catchall logic block 538. For example, if ELSE=N at logic block 536, then at logic block 537, the processing system determines that its tabulation is complete, and sets the total value of PHL to the total number computed through the flow diagram ($PHL_{TOT}$). The ascertained PHL value may be used for various purposes to mitigate overall pedestrian risks, including for use as comparison to pre-set PHL values such as in the example of FIG. 4, above. In some embodiments, these techniques may also be used to assist in connection with determining a threshold value itself.

Figure 6:
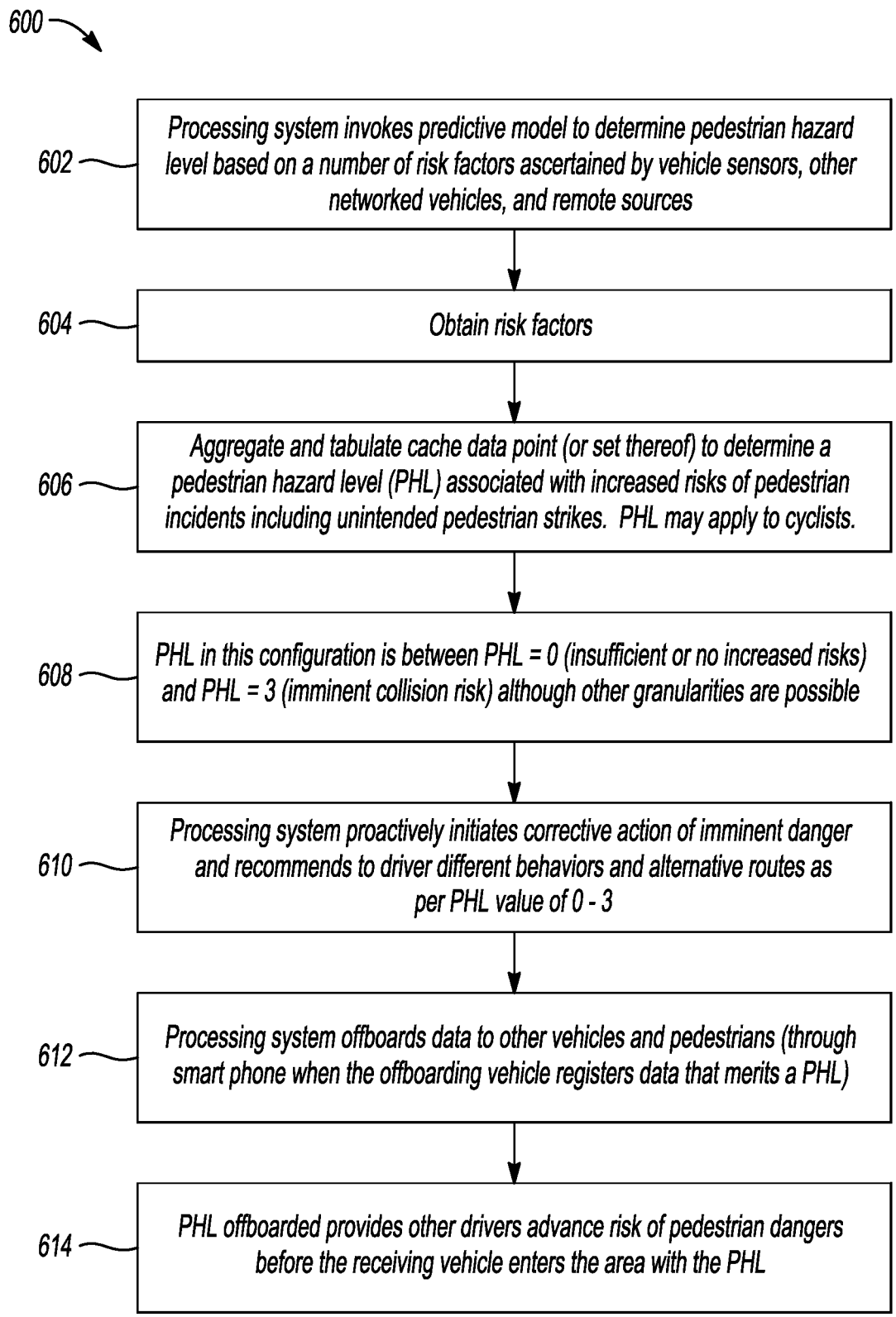
FIG. 6 is an illustrative flow diagram describing the processing system's invocation of a predictive model to determine a PHL value, deploy appropriate countermeasures to mitigate the risk of vehicles hitting pedestrians, and offboard data relating to the risk to other drivers according to some embodiments.

FIG. 6 is an illustrative higher level flow diagram 600 describing the processing system's invocation of a predictive model to determine a PHL value, to deploy appropriate countermeasures to mitigate the risk of vehicles hitting pedestrians, and to offboard data relating to the risk to other drivers according to some embodiments. As before, the logic blocks of FIG. 6 may be performed by the PDPR system 300 including the processing system 317 (FIG. 3) and related elements. Referring first to logic block 602, the processing system may invoke executable code defining a predictive model that may work in conjunction with other modules to determine a PHL based on a number of risk factors discussed at length with reference to FIGS. 4 and 5, and elsewhere in this disclosure. Relevant data may be gathered from the observations of the driver or vehicle occupants, the onboard sensors, cameras, and electronic devices. and other networked sources and networked vehicles to obtain a set of data points relating to the possibility of pedestrians in an area defined either around the vehicle, in the path of the vehicle (if identified in a GPS, for example), or both, Logic block 604, which may closely follow and partially overlap logic block 602, enables the processing system to use the predictive model to obtain actual risk factors, quantified in one embodiment as a plurality of PHLs for use as thresholds or in comparing to threshold values and an overall PHL calculated (see logic block 606) for the vehicle and for comparisons with one or more threshold PHL values.

Using the data gathered in logic block 602 and the risk factors obtained based on that data, the processing system at logic block 606 may execute a program that aggregates and tabulates, in cache data points or sets of such data points (or DRAM, flash memory, etc.) representing an overall PHL (or plurality of region-based PHLs, in some embodiments) associated with increased or imminent risks of pedestrian incidents, from harmless contact to unintended pedestrian strides. As noted previously, in some embodiments, the PHL may apply to cyclists.

The predictive based algorithm(s) in the present disclosure may vary dramatically without departing from its spirit or scope. One example used in this disclosure is that the PHL in this configuration (logic block 608) is between PHL=0 (where there may be very moderate to insufficient to very limited risks of pedestrian encounters with a vehicle), on up in integer increments as described above to PHL=3 (involving an imminent collision risk or pedestrian strike). It will be appreciated in the art that, particularly as the third party communications and the sensors equipped on the vehicles become more accurate and precise, other granularities, and higher numbers of PHL are not just possible, but may be beneficial, efficient, and high-precision in nature.

At logic block 610, the processing system, ideally armed with its accurate predictive knowledge of the numbers and precise locations of pedestrians in the neighborhood of the vehicle, may proactively compare subsequent PHL risk factors to existing thresholds and, in or near real time, initiate corrective action, which may be automatic in nature and whose magnitude may be larger as the risk of imminent danger is larger. Where risk factors are not as significant, it may be sufficient based on the PHL value for the processing system to use the display and loudspeakers to recommend immediate corrective action to the driver, such as to decelerate or brake, or change direction. As the risk of pedestrian involvement with vehicles increases to 2, for example, the processing system may determine that a combination of automated actions (slowing the vehicle down and honking the horn, for example), with immediate driver instructions to maneuver away represents the optimal solution to avoid or mitigate pedestrian incidents.

The pedestrian risk information is advantageously not merely limited to the one vehicle. With the onset of V2V and V2X technologies involving efficient and concise information exchange between vehicles and mobile devices of pedestrians, the processing system in one embodiment at logic block 612 may offboard data to these other vehicles/ pedestrians where the offboarding vehicle registers data that merits a PHL. In addition, where one or more vehicles equipped with V2V technology enter areas congested with pedestrians, at logic block 614, the offboarding of PHL data may provide other drivers advance knowledge of the risks of pedestrian dangers, meaning that the vehicle may take measures such as alternative routes to avoid the encounter before the receiving vehicle ever enters the area in which the PHL/PHLs are applicable.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A vehicle, comprising:
   a vehicle body;
   a plurality of sensors coupled with the vehicle body; and
   a processing system arranged in the vehicle body and configured to:
   identify, using the plurality of sensors, a plurality of data elements indicating that the vehicle is a potential hazard to a pedestrian;
   determine a pedestrian hazard level (PHL) based on the plurality of data elements as identified, the PHL determination being based at least in part on adding together a plurality of weighted numerical values ascribed to different ones of the plurality of data elements; and
employ one or more countermeasures in response to the PHL meeting a threshold.

2. The vehicle of claim 1, wherein the processing system is further configured to:
identify the plurality of data elements using third party data from one or more of (1) external vehicle sources and (2) other vehicles via a wireless network connection.

3. The vehicle of claim 2, wherein the processing system is further configured to:
use the plurality of sensors and the external vehicle sources to identify (1) information related to pedestrian populations in regions within a specified range of the vehicle, and (2) conditions of the regions including weather and pedestrian activity.

4. The vehicle of claim 1, wherein upon determining that the PHL meets a threshold, the processing system is further configured to:
identify when the vehicle is entering a region, or is within the region, which poses an increased risk of a pedestrian-related incident; and
proactively alert a driver of the vehicle to the increased risk and proactively initiate automated action to attempt to prevent occurrence of, or reduce the increased risk of, the pedestrian-related incident.

5. The vehicle of claim 4, wherein the one or more countermeasures include:
the proactive alert conveyed to the driver via a vehicle display;
the initiated automated action; and
at least one suggested alternate route calculated by the processing system and displayed on the vehicle display for rerouting the driver away from the region.

6. The vehicle of claim 1, wherein in response to the PHL meeting the threshold, the processing system is further configured to;
automatedly increase, in or near real-time, a sensitivity of one or more forward collision sensors of the vehicle.

7. The vehicle of claim 1, wherein:
in determining the PHL, the processing system is further configured to invoke a predictive model that evaluates relative risk factors relevant to vehicle maneuvers tending to cause or avoid a potential pedestrian strike; and
the processing system is further configured to evaluate risk factors in the predictive model using the plurality of data elements from the plurality of sensors and other data received over a wireless network from another vehicle or source.

8. The vehicle of claim 7, wherein the risk factors include one or more of:
an estimated density of pedestrians in a region;
one or more pedestrians detected in an immediate vicinity of the vehicle by one or more of the plurality of sensors;
a relative likelihood of pedestrian activity nearby a certain zone during a specific time;
inclement weather; and
driving behaviors that adversely affect vehicle handling.

9. The vehicle of claim 7, wherein the processing system is further configured to:
aggregate and tabulate each of the plurality of data elements, using the predictive model, to determine a first PHL that extends from minimal to no pedestrian risk, to one or more ascending PHLs relevant to a progressively increasing pedestrian risk, to an upper PHL corresponding to a potentially imminent pedestrian strike; and
employ at least one countermeasure for the determined PHL but for the first PHL value corresponding to minimal or no pedestrian risk.

10. The vehicle of claim 9, wherein when the determined PHL based on the predictive model designates a region of increased pedestrian density but without imminent risk of a strike, the corresponding one or more countermeasures comprise at least one of:
alerting a driver using visual cues via the vehicle display;
using audio or verbal cues via one or more speakers; and
increasing a sensitivity of one or more of the plurality of sensors.

11. The vehicle of claim 9, wherein the processing system is further configured to:
use the predictive model to detect the PHIL corresponding to at least moderate risk of a subsequent pedestrian strike, including a dense pedestrian population in relative proximity to the vehicle; and
issue one or more countermeasures including:
automatedly limiting vehicle speed in or near-real time at a rate and magnitude proportionate with the relative proximity of the pedestrian population to the vehicle; and
alert a driver via audio or haptic feedback.

12. The vehicle of claim 11, wherein the one or more countermeasures include adjusting lighting to:
provide clarity for one or both of the driver and the dense pedestrian population; and
further heightening of the sensitivity of one or more of the sensors.

13. The vehicle of claim 9, wherein the processing system is further configured to:
determine, using the predictive model, the PHL within a possible range of PHLs corresponding to a potentially imminent collision with a high degree of confidence;
employ countermeasures including automatic braking and engaging a horn on the vehicle to alert pedestrians; and
employ, based on the predictive model, a plurality of different ones of the countermeasures concurrently.

14. The vehicle of claim 13, wherein the processing system is further configured to;
offboard risk data identified by the predictive model to other vehicles through one or more networks to generate a shared awareness of pedestrian-related risks in the area.

15. A transport structure, comprising:
a body;
a dashboard arranged within the body;
a display on the dashboard;
a processing system coupled to the body;
a wireless transceiver coupled to the processing system and configured to receive data from an external source for forwarding to the processing system; and
a plurality of sensors arranged on the body, the processing system being electrically connected to the sensors and configured to receive data indicative of sensor type,
wherein the processing system is further configured to:
identify, using the plurality of sensors, a plurality of data elements indicating that the vehicle is a potential hazard to a pedestrian;
invoke a predictive model for estimating a pedestrian hazard level (PHL) based on the plurality of data elements as identified, the PHL being based at least in part on adding together a plurality of weighted numerical values ascribed to different ones of the plurality of data elements, the PHL having a plurality of values commensurate with successive levels of increasing risk in different situations of a pedestrian incident, each of the plurality of values determined by the processing system based at least in part on the received data from the plurality of sensors and the external source;

recommend action to a driver; and automatedly initiate proactive vehicular action to mitigate the risk of the pedestrian incident.

16. The transport structure of claim 15, wherein;
the external source comprises another vehicle; and
the data is precautionary data.

17. The transport structure of claim 15, wherein for at least one of the values of the PHL, the processing system is further configured to;
recommend adjusting behavior of a driver to mitigate the risk of the pedestrian incident.

18. The transport structure of claim 15, wherein at least one of the sensors and the external source are configured to convey to the processing system an estimated pedestrian density in an identified region.

19. The transport structure of claim 15, wherein in evaluating at least one of the values of the PHL, the processing system is further configured to;
determine an increased likelihood of pedestrian activity near a specified time or geographical zone; and
communicate the information to the driver of the vehicle via the display.

20. A method for use aboard a vehicle, comprising:
identifying, using a plurality of sensors of the vehicle, one or more a plurality of data elements indicating that the vehicle is a potential hazard to a pedestrian;
determining, via a processing system of the vehicle, a pedestrian hazard level (PHL) based on the plurality of data elements as identified, the PHL determination being based at least in part on adding together a plurality of weighted numerical values ascribed to different ones of the plurality of data elements; and
employing one or more countermeasures via the processing system when the PHL meets a threshold.

* * * * *